United States Patent [19]

Gally

[11] Patent Number: 5,354,085
[45] Date of Patent: Oct. 11, 1994

[54] SPRUNG BICYCLE

[76] Inventor: Otto Gally, Oberauer Strasse 4, Farchant, Fed. Rep. of Germany, 8105

[21] Appl. No.: 811,499

[22] Filed: Dec. 20, 1991

[30] Foreign Application Priority Data

Dec. 21, 1990 [DE] Fed. Rep. of Germany ....... 4041375

[51] Int. Cl.$^5$ .............................................. B62K 25/04
[52] U.S. Cl. ................... 280/285; 280/276; 280/284; 280/703; 267/34
[58] Field of Search ............... 280/275, 276, 277, 284, 280/285, 714, 703, 708, 709, 710; 180/227, 231; 188/299, 285; 267/34, 64.25, 64.15

[56] References Cited

U.S. PATENT DOCUMENTS

| | | | |
|---|---|---|---|
| 468,643 | 2/1892 | Clement | 280/284 |
| 714,121 | 11/1902 | Williams | 280/284 |
| 2,618,478 | 11/1952 | Conway | 267/34 |
| 3,907,332 | 9/1975 | Richardson | 280/285 |
| 4,034,821 | 7/1977 | Stoddard et al. | 180/227 |
| 4,159,105 | 6/1979 | Vander Laan | 280/710 |
| 4,572,317 | 2/1986 | Isono et al. | 280/285 |
| 4,599,079 | 7/1986 | Chappell | 474/80 |
| 5,226,674 | 7/1993 | Buell | 280/285 |

FOREIGN PATENT DOCUMENTS

| | | | |
|---|---|---|---|
| 3500601A1 | 7/1986 | Fed. Rep. of Germany . | |
| 3542353A1 | 6/1987 | Fed. Rep. of Germany . | |
| 3923226A1 | 1/1990 | Fed. Rep. of Germany . | |
| 0338313 | 5/1904 | France | 280/276 |
| 369377 | 1/1907 | France . | |
| 0533025 | 2/1922 | France | 280/276 |
| 933079 | 4/1948 | France . | |
| 0529305 | 11/1940 | United Kingdom | 280/285 |
| 1485451 | 9/1977 | United Kingdom . | |

*Primary Examiner*—Margaret A. Focarino
*Assistant Examiner*—Anne Boehler
*Attorney, Agent, or Firm*—Townsend and Townsend Khourie and Crew

[57] ABSTRACT

On a sprung bicycle (10), provision is made for a rear wheel (26) of the bicycle (10) to be mounted by way of a knee lever (34). A spring mechanism (42) is articulated to the knee lever (34) and exhibits an inhibiting device (50). The locking device (50) is actuated by way of a driving-force sensor (52), which permits automatic locking as increasing force is exerted on the pedals.

15 Claims, 3 Drawing Sheets

SPRUNG BICYCLE

BACKGROUND OF THE INVENTION

The invention refers to a sprung bicycle.

Such sprung bicycles, whose rear wheel is cushioned against the frame with a spiral compression spring, are known from U.S. Pat. Nos. 4,582,343 and 4,679,811.

With a manually actuated locking device, the spring action can be deactivated if a more sporty response and less comfort are desired. It is furthermore known from U.S. Pat. No. 4,582,343 how to effectuate the deactivation of the spring action only in the direction of spring compression, and to use for this purpose an appropriate check valve in the hydraulic circuit of a shock absorber.

When riding on hills, particularly under competition conditions, the rider is as a rule completely absorbed in operating the shift levers to select the proper gear, as well as applying the maximum force, so that if only for that reason alone, requiring the execution of an additional operating function is awkward. Also, frequently an appropriate switchover cannot be performed fast enough or is entirely omitted in the face of a rapid succession of trackless segments in which the spring action is desirable, and straight segments in which the spring action is not desired.

SUMMARY OF THE INVENTION

By contrast, it is the task of the invention to create a sprung bicycle that allows for a comfortable and sporty ride even in the event of a rapid succession of varying route segments, without the need to incur considerable disadvantages as to weight and center of gravity.

This task is accomplished under the invention by the present disclosure. Advantageous further developments follow from the subclaims.

The automatic response, under the invention, of the inhibiting device, which may also be configured as a locking device, is particularly advantageous when the rider exerts at least a substantial force on the pedals. By means of this automatic action, a wheel suspension appropriate to different operating conditions can be provided. It has been found that when riding over an obstacle, both the competitive and the everyday rider reduce their driving force, while the competitive rider even jumps over the obstacle with the aid of the racing clips attached to the pedals. On the other hand, when the driving force is reduced or taken away, the full possibility for spring action is conserved.

When riding uphill, on the other hand, an increased driving force is applied, such that the resilience automatically first becomes stiffer, and locks as the driving force increases. One-way locking, which favors the rebound position of the rear wheel, can be used when riding uphill, not only to provide a more favorable position of the center of gravity, but also to increase the clearance above the ground. Furthermore, when riding uphill, spring-compression motion has an effect of absorbing power, so that the power-transmission efficiency remains the same in comparison to a bicycle with a rigid frame when spring compression is prevented.

According to an advantageous embodiment the driving-force sensor is configured in the manner of a chain-oil applicator mounted on the derailleur. This float-mounting permits it readily to follow the movements of the chain, yet also allows it to ensure reliable measurement of the driving force even when the chain is only very slightly deflected. With this configuration, with a slight deflection of the chain by, for example, 2 mm over a length of 10 cm, it is particularly advantageous that the expenditure of force to stretch the chain when the driving force is applied is several, and in particular three, orders of magnitude less than the total driving force. Thus the reduction of efficiency caused by the driving-force sensor is attributable practically solely to the rolling resistance of the employed rollers, and this too can be kept very small.

When using a hydraulic cylinder to relay the measurement signal from the driving-force sensor, it is particularly advantageous that here very small forces are required for the actuation of the locking device. When so desired, a front wheel suspension with a corresponding locking device can even be provided, which can be supplied by way of the same hydraulic line.

According to another advantageous embodiment, provision is made to use a sheath-like locking bushing that surrounds the seat tube. When the locking bushing is in its upper position, the entire spring path of the rear wheel suspension may be utilized, wherein the maximum extent of spring compression may for example be 65 mm, and the maximum extent of spring rebound may for example be 35 mm. The locking bushing, which for example may act against a cross-tube of the rear stays, which is present anyway, permits the path of spring compression to be softly limited or blocked completely if so desired.

It is particularly advantageous to produce the spring mechanism by means of a spiral compression spring in which a shock absorber is provided. With a knee lever—or a correspondingly configured plate—the force acting on the rear stays can be elastically absorbed before the seat tube, namely in its lower regions. This arrangement is favorable in terms of both place and weight, particularly in regard to a low center of gravity. Furthermore, for reasons of weight it is favorable for the knee lever to be mounted comparatively low down, so that the rear stays do not extend to the top tube, as in a diamond frame, but—for example as in a Mixte frame—extend to approximately the middle of the seat tube. This also makes it possible to work with lighter-weight springs.

In addition, through the use of the knee lever it is possible to produce a favorable and desirable spring characteristic.

Moreover, arranging the spring mechanism under the invention only (for example) on the lower half of the seat tube allows for attachment of a water bottle above the knee lever if desired.

It is understood that the knee lever may also be mounted at the end of the lower third of the seat tube. By using various penetrating holes on the front leg of the knee lever, to each of which the compression spring may be articulated, an adjustment for different weights of the riders can easily be effectuated.

It is also advantageous that the spring force runs in the direction of the bottom-bracket housing, so that no additional reinforcement is necessary.

A further advantageous aspect consists in that it is also easily possible to produce women's or Mixte bicycles.

According to another aspect of the invention, provision is made for the front fork to be spring-mounted with a parallelogram suspension, with a compression spring extending between the stem or handlebars and a sprung part of the front wheel suspension. For this purpose the stem may be equipped with a pivot bearing with a horizontal axis, extending between the steering tube and the front portion of the stem. Here it is understood that the pivot bearing must be held in a rigid connection in order to transmit the torsional forces applied by the one-sided tension on the handlebars when force is being strongly exerted.

The parallelogram suspension of the front wheel makes it possible to reliably avoid the drawbacks of a telescopic suspension, with its tendency to jam during braking. Moreover, an appropriate constructional design makes it possible to reduce the tendency to upend during braking.

Further particulars, advantages and characteristics can be seen from the following description of an exemplary embodiment with reference to the drawings.

DETAILED DESCRIPTION OF THE PREFERRED EMBODIMENT

Figure 1:
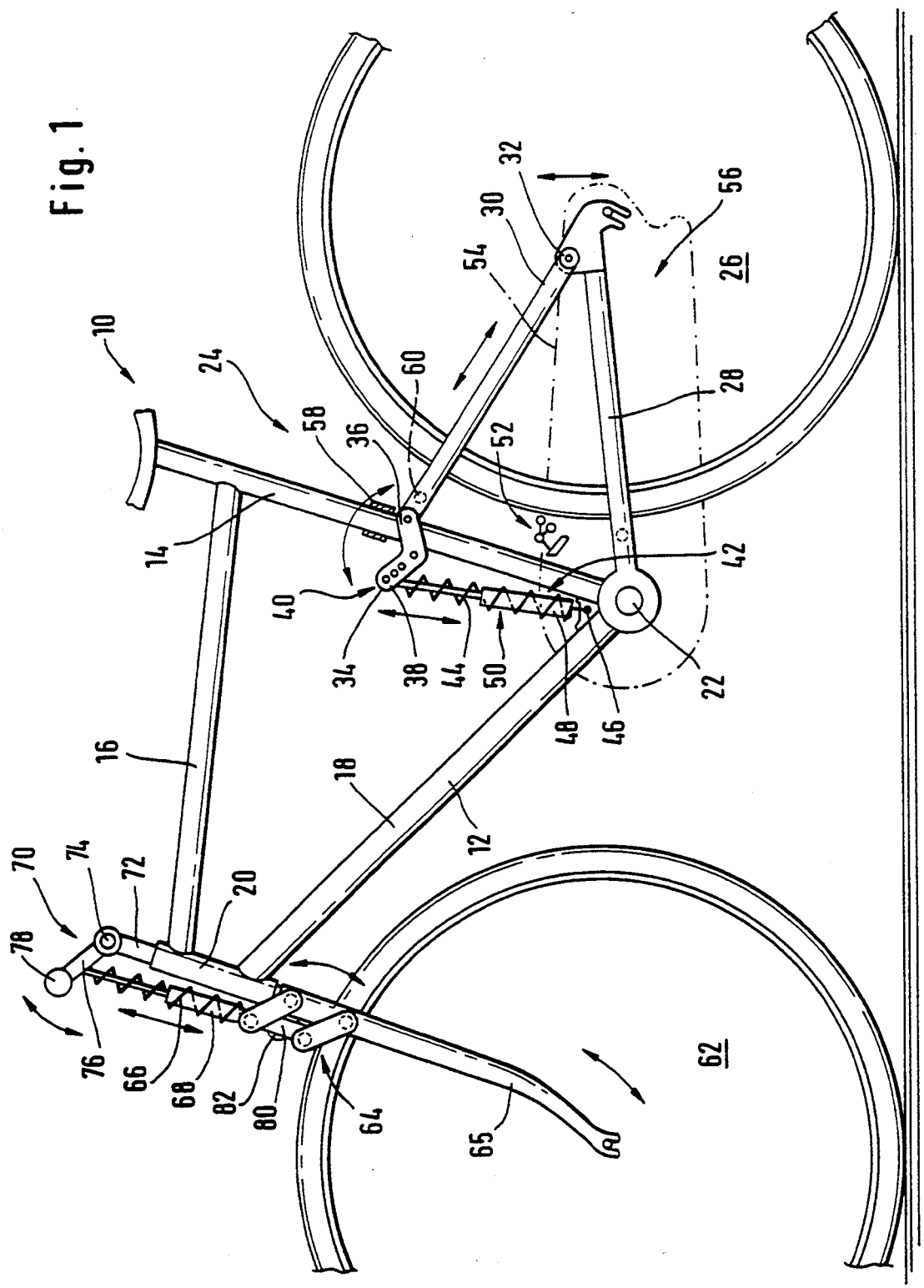
FIG. 1 a schematic side view of a sprung bicycle under the invention, in an embodiment of the invention.

A bicycle 10 illustrated in FIG. 1 exhibits a frame 12, which consists of a seat tube 14, a top tube 16, a down tube 18, and a head tube 20. On the seat tube 14 and on a bottom-bracket housing 22 is attached a wheel suspension 24 which ensures a spring mounting of a rear wheel 26 to the frame 12. For this purpose a bottom-bracket stay 28 is swivel-mounted around the bottom-bracket housing 22. A rear stay 30 is mounted by way of a pivot bearing 32 to the bottom-bracket stay 28, close to its back end. The front end of the rear stay 30 is joined to a knee lever 34, which is part of the wheel suspension 24.

The knee lever 34 is mounted approximately in the middle of the seat tube 14 and its rear leg 36 extends, overlapping the side of the seat tube 14, to the rear stay 30. Its front leg 38 is provided with a plurality of penetrating holes 40, and a spring mechanism 42 is selectively articulated to one of the penetrating holes 40. The spring mechanism 42 exhibits a spiral compression spring 44 and has its lower bearing point 46 mounted just above the bottom-bracket housing 22.

The spring mechanism 42 furthermore exhibits a working cylinder or shock absorber 48, which extends inside the spiral spring 44 and surrounds an inhibiting device 50. By way of a hydraulic line (not shown in FIG. 1), the locking device 50 is connected to a driving-force sensor 52, which runs along a drive chain 54 that is part of a drive train 56, otherwise not shown. The driving-force sensor 52 is shown in more detail in FIG. 5.

Surrounding the seat tube 14, and just above the knee lever 34, a locking bushing 58 is provided which can be slid downward and in this position prevents further spring compression on the rear wheel 26. For this purpose the locking bushing 58 is supported against a cross tube 60 disposed between the rear stays 30.

A front wheel 62 of the bicycle 10 is supported against the frame 12 or head tube 20 by way of a parallelogram suspension 64 and a fork 65. The parallelogram suspension 64 is spring mounted via an additional spiral compression spring 66, and the spiral compression spring 66 extends substantially upright in front of the head tube 20 and preferably likewise encloses a shock absorber 68.

The spiral compression spring 66 is supported at its upper end against a stem 70, which in the shown exemplary embodiment exhibits a front piece 76 swivel-mounted on a steering tube 72 by way of a pivot bearing 74, such that a handlebar 78 is likewise spring-mounted with respect to the head tube 20. Due to this mounting the spring path of the parallelogram suspension 64 is added to that of the handlebar 78, although only one spiral compression spring 66 is necessary.

As shown schematically in FIG. 1, a support element 80 is connected to the steering tube 72 in such a way as not to rotate. On both sides of this support body 80, the parallelogram suspension 64 of the fork 65 is mounted so as to pivot. The fork 65 is in turn connected to a pressure plate 82 that represents a lower coupling point for the spiral compression spring 66. It is particularly advantageous in this arrangement that the fork-column angle as well as the rake of the front fork 65 are practically invariable with regard to the spring action.

Figure 2:
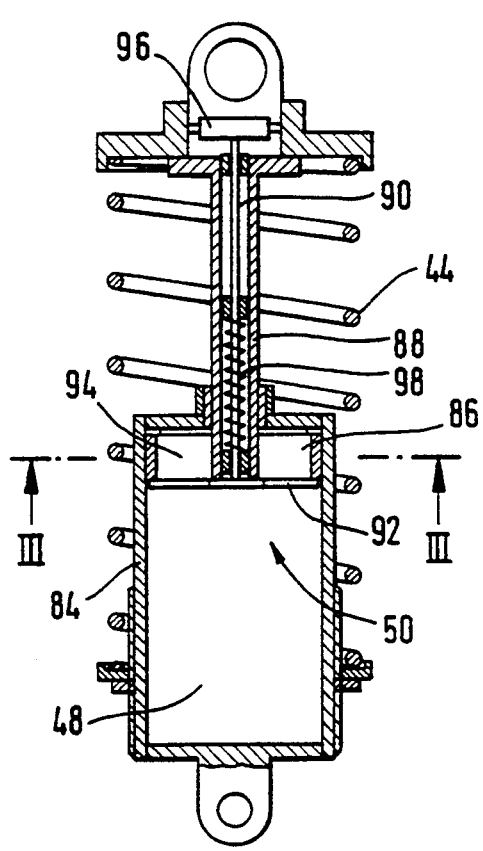
FIG. 2 a schematic side view of the spring mechanism for use in the bicycle according to FIG. 1.

The shock absorber 48 shown in FIG. 2 exhibits a pressure cylinder 84 and a piston 86 guided in the pressure cylinder 84. The piston 86 is linked to the knee lever 34 by way of a piston rod 88.

Figure 3:
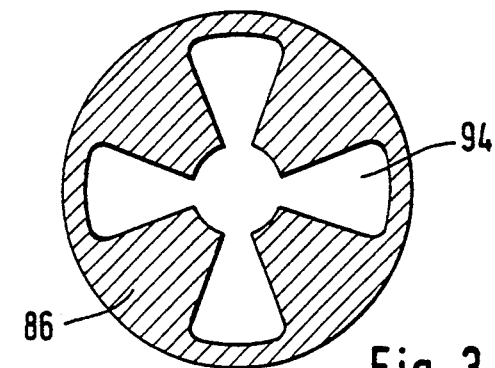
FIG. 3 a section through the piston according to FIG. 2, along line III—III.
Figure 4:
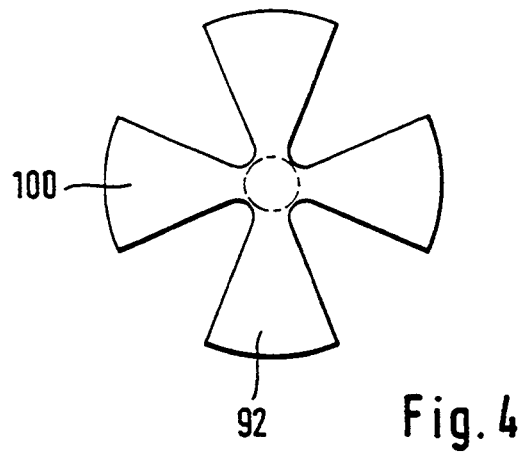
FIG. 4 a view of the blocking disk from FIG. 2, from below.

The piston rod 88 is configured in a tube shape, and accepts a drive shaft 90, which is rigidly joined to a blocking disk 92 whose configuration can be seen in FIG. 4. The blocking disk 92 is applied against the piston 86 from below and in its locked position covers corresponding penetrating holes 94 in the piston 86; these can also be seen in FIG. 3. The drive shaft 90 is swivel-mounted in the piston rod 88 and at its top end exhibits a gear mechanism 96, by means of which its rotated position can be controlled by the driving-force sensor 52 shown in FIG. 5. It has a spring contact against the piston 86 at the bottom by means of a support spring 98.

The gear mechanism 96 furthermore exhibits a manual control mechanism (not shown), by means of which the locking disk 92 may selectively be stopped in a given position manually. FIG. 3 shows the piston 86 in a cross section along line III—III from FIG. 2. As can be seen here, in this exemplary embodiment the penetrating holes 94 are kept relatively large, such that in the fully opened position of the blocking disk 92 the working cylinder or shock absorber 48 does not act as a shock absorber at all, and a free spring action is possible instead. It is also understood that in some other exemplary embodiment, small resistance openings for the hydraulic oil might be provided in the piston 86, in an already known manner.

Wings 100 on the blocking disk 92 are configured in such a way that they can cover, with a slight overlap, the penetrating holes 94 in the piston 86 as shown in FIGS. 4 and 3. This permits a well-sealed and secure locking in the locked position of the inhibiting device 50, in which, moreover, the combination of blocking disk 92 and piston 86 together with the support spring 98 acts as a check valve. Due to this combination, a spring compression corresponding to a compression of the spring mechanism 42 is no longer possible, but on the other hand, a spring rebound corresponding to an expansion of the spring mechanism 42 and the shock absorber 48 is indeed possible.

Figure 5:
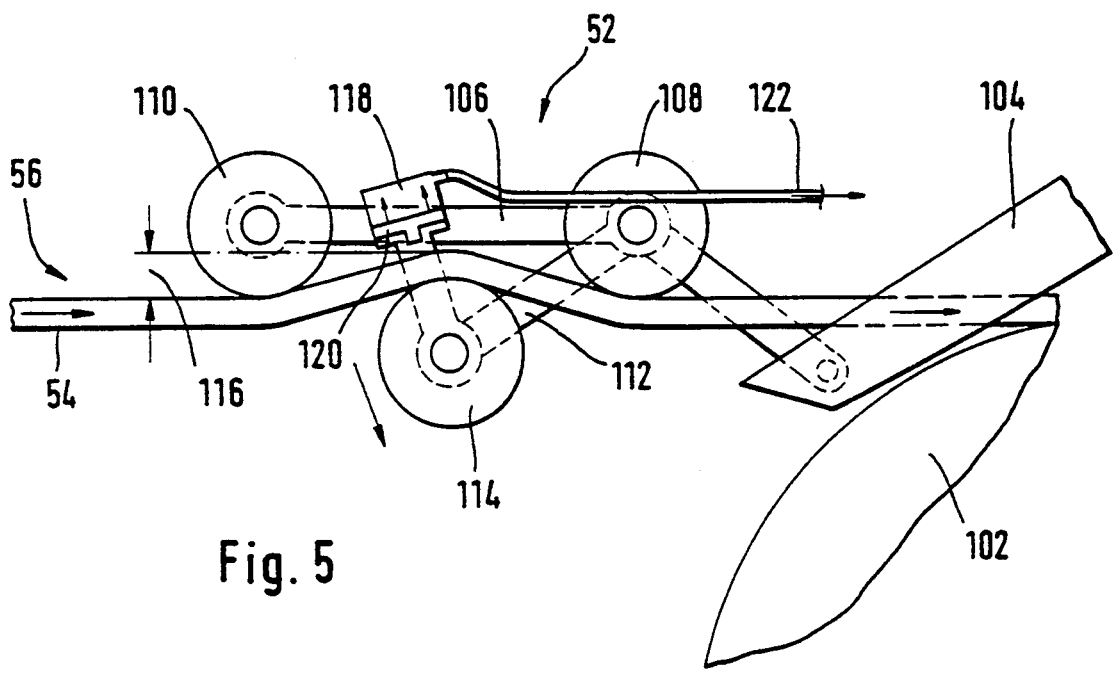
FIG. 5 a schematized view of the driving-force sensor under the invention.

FIG. 5 schematically shows the driving-force sensor 52 under the invention. The drive chain 54 runs over a front chain ring 102, and in a known manner a derailleur 104 allows for switching between chain rings of different sizes. On the derailleur 104, a support lever 106 is firmly mounted, and carries two rollers 108 and 110. These rollers run along and on top of the drive chain 54.

On the support lever 106, close to the roller 108 adjacent to the derailleur 104, a third roller 114 is swivel-mounted by way of a sensing lever 112, and in addition the roller 114 is pressed in the direction of the rollers 110 and 108 by means of a spring (not shown). The roller 114 also runs along the drive chain 54, but from below.

Thus the drive chain 54 runs between the rollers 110 and 108 on the one side and the roller 114 on the other side, in a slightly bowed shape; the deflection 116 is exaggerated considerably in FIG. 5 for clarity's sake.

The driving-force sensor 52 furthermore exhibits a pickup cylinder 118, which is mounted on the support lever 106, as well as a pickup piston 120 that is guided in the pickup cylinder 118 and joined to the roller 114. The pickup cylinder 118 is connected to a hydraulic line 122, which in turn is connected to the gear mechanism 96 shown schematically in FIG. 2.

In this way the size of the deflection 116 of the drive chain 54 is transmitted via the hydraulic line 122 as a hydraulic pressure signal, and makes it possible to adjust the blocking disk 92 from FIG. 2. The arrangement here is designed in such a way that a reduced deflection 116, corresponding to an increasing driving force on the drive train 56, causes an increasing locking of the blocking disk 92 in regard to the piston 86, such that the suspension becomes stiffer as soon as more force is applied to the pedals.

It is understood that multiple modifications of the invention are possible without departing from its scope. For example, instead of the hydraulic transmission of the driving-force sensor signal, a mechanical transmission may be chosen.

Also, the hydraulic line 122 may be continued onward to the front shock absorber 68 in order to produce a corresponding locking action there.

If desired, the manual control mechanism may be completely omitted. Also, the driving-force sensor may be kinematically reversed, such that two rollers swivel-mounted with respect to the derailleur 104 are opposed by one roller immovably mounted with respect to the derailleur 104.

Figure 6:
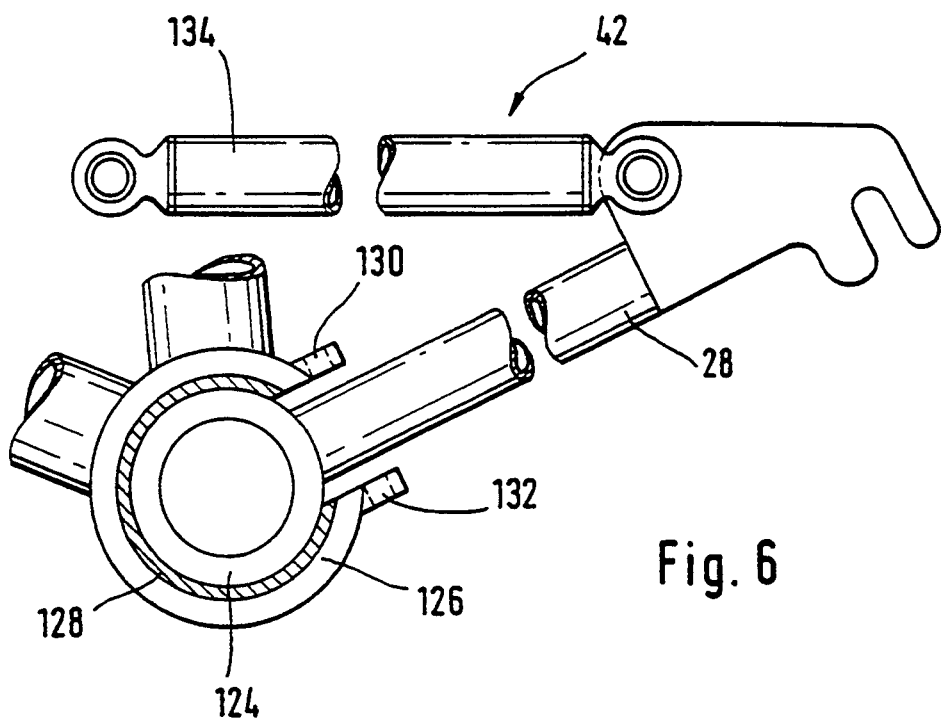
FIG. 6 another configuration of the bottom bracket for a bicycle under the invention.

According to the embodiment shown in FIG. 6, provision is made for the bottom-bracket stay 28 to end with an articulated head 124 in front, which is mounted by means of a known friction bearing 128 in a bottom-bracket housing 126 that is open to the rear. This solution affords advantages in assembly, in that the bearing play between the two bottom-bracket stays, of which the bottom-bracket stay 28 is shown in FIG. 6, can very easily be adjusted by means of appropriate flanges (130, 132).

Figure 7:
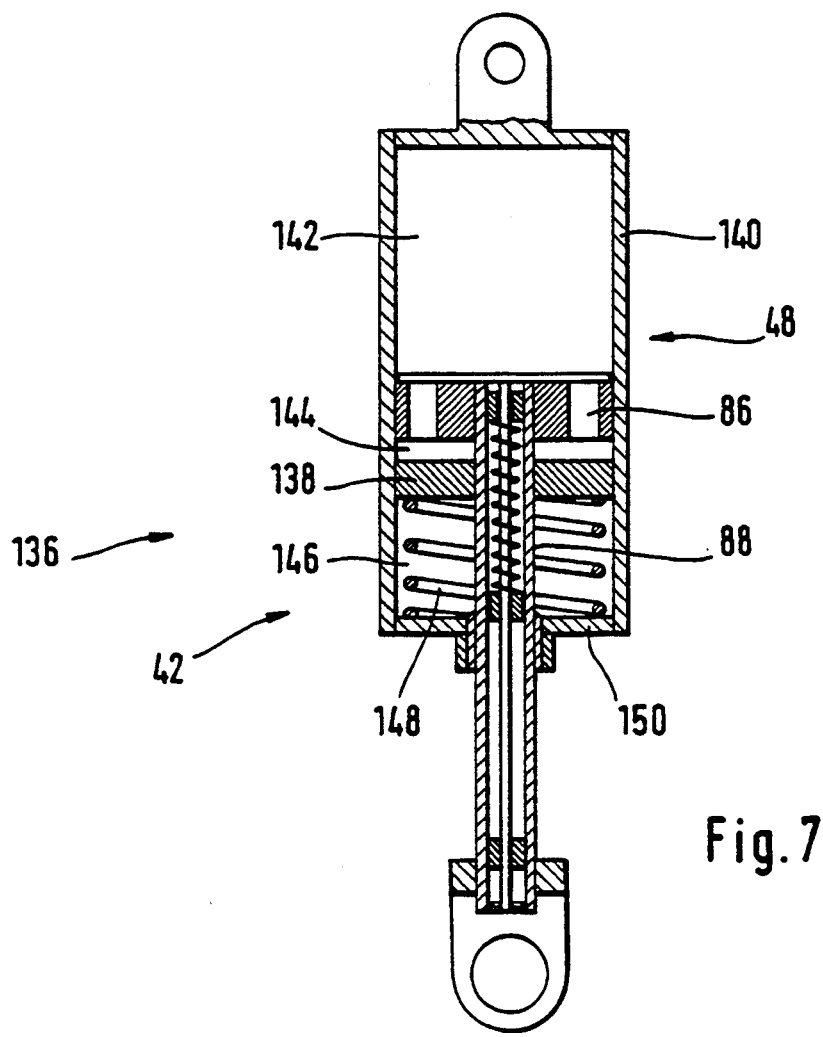
FIG. 7 another embodiment of the spring mechanism for use in the bicycle according to FIG. 1.

In the exemplary embodiment shown in FIG. 6, the spring mechanism 42 is configured in the form of a telescopic strut 134 that replaces the rear stay and for example can have the structure shown in FIG. 7; it then exhibits the inhibiting device 50, even if this is not shown in detail.

While in the version of the spring mechanism 42 in FIG. 2, an air cushion may be provided to compensate for the volume of the piston rod 88, in the configuration of the spring mechanism 42 as a piston/cylinder arrangement 136 according to FIG. 7, a separate equalization disk 138 is provided, which extends around the piston rod 88 and is mounted on this latter against the inner circumference of a cylinder 140 of the piston/cylinder arrangement 136.

The piston 86 here separates a working chamber 142 from an equalization chamber 144, both of which are filled with a substantially incompressible fluid and—as described above—have a flow connection with one another in a manner that can be influenced by the inhibiting device 50.

The equalizing disk 138 separates the equalization chamber 144 from an expansion chamber 146 that is gas-filled and contains a spring 148, configured here also as a compression spring. The spring 148 is substantially stiffer than the spring from the spring mechanism 42 as shown in FIG. 2, since the cushioning takes account of only the change in volume produced by the entry of the piston rod into the equalization chamber 144. As the volume of the working chamber 142 decreases and the volume of the equalization chamber 144 increases accordingly, the equalization disk 138 in the exemplary embodiment shown in FIG. 7 moves downward, i.e., against the action of the spring 148. The indirect assurance of the spring effect is particularly favorable, since a spring located on the outside and thus exposed to dirt can be completely avoided. By filling with a suitable medium, the spring 148 can furthermore be protected against corrosion.

A further configuration that comes under consideration when a longer structural length is available consists of situating the spring 148 in the working chamber 142.

The cylinder 140 in the shown exemplary embodiment according to FIG. 7 is sealed off at the bottom with a sealing disk 150. The sealing disk 150 has a threaded engagement with the cylinder 140, which allows for easy adjustment of the spring stiffness. Of course, the piston/cylinder arrangement 136 may also be reverse mounted, if desired, so that the piston rod 88 extends upward.

According to another modification, provision is made for the spring 148 to be replaced with a gas compression spring, so that the piston/cylinder arrangement 136 assumes the structure of a known gas compression spring which however is modified under the invention.

According to another configuration of the invention, provision is made for the driving-force sensor 52 to be mounted directly on the derailleur (104). Here a height compensation between the different heights of the front chain rings must be created. It is also possible to mount the derailleur itself so as to pivot around a horizontal transverse axis, and to mount only one roller 108 at the back end of the derailleur 104 in order to create the driving-force sensor 52.

What is claimed is:

1. A bicycle, comprising:
   a frame;
   a first wheel mounted to the frame;
   a second wheel mounted to the frame;
   at least one pedal rotatably mounted to the frame;

a resilient wheel suspension secured to the frame, having a spring mechanism resiliently coupling the frame and one of said first and second wheels, and an inhibiting device acting on the spring mechanism;

a drive train coupled to the at least one pedal and to the second wheel so that a driving force can be transferred from the at least one pedal to the second wheel; and a driving-force sensor having means for sensing the driving force transmitted to the second wheel through the drive train, the driving-force sensor being operatively coupled to the inhibiting device.

2. The bicycle according to claim 1, wherein the inhibiting device includes means for locking the spring mechanism against spring compression.

3. The bicycle according to claim 1, wherein the drive train includes an endless drive chain having an upper segment, and the driving-force sensing means measures a deflection of the upper segment.

4. The bicycle according to claim 1, wherein the spring mechanism comprises a spring suspended from the frame adjacent to a bottom-bracket housing.

5. The bicycle according to claim 1, including a second spring mechanism and a second inhibiting device, said second spring mechanism coupling the frame and the other one of said first and second wheels, the second inhibiting device acting on the second spring mechanism.

6. The bicycle according to claim 4, wherein the spring comprises a spiral spring which surrounds a shock absorber configured to be locked in the direction of compression of the spring by the inhibiting device.

7. The bicycle according to claim 4, wherein the resilient wheel suspension includes a knee lever mounted to a seat tube of the frame, a rear stay and the spring mechanism being pivotally connected to the knee lever, the spring mechanism including said spring extending downwardly substantially parallel to the seat tube.

8. The bicycle according to claim 7, further comprising a locking bushing movably mounted to the frame for movement between a locked position and an unlocked position, the locking bushing being positioned to lock the knee lever and prevent compression of the spring when in the locked position.

9. The bicycle according to claim 1, wherein the inhibiting device comprises a shock absorber including a piston having penetrating holes, the inhibiting device also including a check valve movably mounted adjacent the piston between an open position and a closed position, the check valve blocking the penetrating holes when in the closed position.

10. The bicycle according to claim 1, wherein the inhibiting device further comprises a piston having penetrating holes therethrough, and a rotatable blocking disk held against the piston under a spring action.

11. The bicycle according to claim 10, wherein the blocking disk is rotatable by way of a drive shaft positioned in the piston rod and connected to the driving-force sensor by a gear mechanism, the gear mechanism being coupled to a manual control mechanism coupled to the blocking disk for movement between open and closed positions, the penetrating holes being blocked by the blocking disk when the disk is in the closed position.

12. The bicycle according to claim 1, wherein the driving-force sensor includes first, second and third rollers which engage the drive train, the third roller lying opposite the first and second rollers, the first and second rollers being joined together by a support lever and the third being joined to at least one of the other two rollers by a sensing lever.

13. The bicycle according to claim 1, wherein the driving-force sensor is supported by a derailleur near a front chain wheel.

14. The bicycle according to claim 1, wherein the drive train includes an endless chain, the driving-force sensor extending between 5 to 20 cm along the drive chain, and in a relaxed state of the drive chain the driving-force sensor deflects the chain by approximately 1 to 7 mm.

15. The bicycle according to claim 4, further comprising a hydraulic line connecting the driving-force sensor and the spring mechanism.

* * * * *